US006833430B2

(12) United States Patent
Yashima et al.

(10) Patent No.: US 6,833,430 B2
(45) Date of Patent: Dec. 21, 2004

(54) PROCESS FOR THE PRODUCTION OF POLYACETYLENE DERIVATIVES

(75) Inventors: Eiji Yashima, Aichi (JP); Katsuhiro Maeda, Aichi (JP)

(73) Assignee: Japan Science and Technology Agency, Saitama (JP)

(*) Notice: Subject to any disclaimer, the term of this patent is extended or adjusted under 35 U.S.C. 154(b) by 104 days.

(21) Appl. No.: 10/257,145

(22) PCT Filed: Apr. 12, 2001

(86) PCT No.: PCT/JP01/03154

§ 371 (c)(1),
(2), (4) Date: Oct. 9, 2002

(87) PCT Pub. No.: WO01/79310

PCT Pub. Date: Oct. 25, 2001

(65) Prior Publication Data

US 2003/0114618 A1 Jun. 19, 2003

(30) Foreign Application Priority Data

Apr. 13, 2000 (JP) ......................... 2000-111547

(51) Int. Cl.$^7$ .............................................. C08G 61/00
(52) U.S. Cl. .................... 528/396; 528/485; 528/486; 528/488; 528/489; 528/499
(58) Field of Search ......................... 528/485, 486, 528/488, 489, 499, 396

(56) References Cited

FOREIGN PATENT DOCUMENTS

| JP | 56-106907 | 8/1981 |
|---|---|---|
| JP | 56-167708 | 12/1981 |
| JP | 07-258344 | 10/1995 |
| JP | 09-176243 | 7/1997 |
| JP | 10-120731 | 5/1998 |

OTHER PUBLICATIONS

Eiji Yashima et al., "Chirality Assignment of Amines and Amino Alcohols Based on Circular Dichroism Induced by Helix Formation of a Stereoregular Poly((4–carboxyphenyl)acetylene) through Acid–Base Complexation," J. Am. Chem. Soc., vol. 119, pp. 6345–6359, American Chemical Society (1997).

Mitsuo Albert Saito et al., "Synthesis and Macromolecular Helicity Induction of a Stereoregular Polyacetylene Bearing a Carboxy Group with Natural Amino Acids in Water," Mocromolecules, vol. 33, No. 13, pp. 4616–4618, American Chemical Society (Jun. 2000).

*Primary Examiner*—Duc Truong
(74) *Attorney, Agent, or Firm*—Rader, Fishman & Grauer PLLC

(57) ABSTRACT

A process for the production of polyacetylene derivatives by which polyacetylene derivatives having an ability to discriminate asymmetry can be easily obtained in a few steps and in high yield and which is also advantageous in respects of economical efficiency, environmental problems, and so on. This process is characterized by polymerizing an acetylene derivative having a hydrophilic functional group in an aqueous solvent in the presence of a water-soluble transition metal complex catalyst and a base.

10 Claims, 3 Drawing Sheets

PROCESS FOR THE PRODUCTION OF POLYACETYLENE DERIVATIVES

TECHNICAL FIELD

The present invention relates to a novel process for the production of a polyacetylene derivative and also to a polyacetylene derivative having a unique ability for discrimination of chirality obtained by the said producing process.

BACKGROUND OF THE INVENTION

With regard to a substance having optical asymmetry, there have been known many substances such as that having asymmetric carbon and that having the so-called molecular asymmetry. Those substances have been widely used in industry as agents for optical resolution, materials for liquid crystals, chiral sensors, nonlinear optical materials and other functional materials.

Among those asymmetric molecules, high-molecular substances having molecular asymmetry have been receiving public attention in recent years and, for example, there have been known optically active polyacrylamide derivatives (Japanese Patent Publication No. 167708/1981) and poly (triphenylmethyl methacrylate) (Japanese Patent Publication No. 106907/1981) having a helical structure and a high optical rotatory power.

The present inventors previously found that polymers of (4-carboxyphenyl)acetylene showed an induced circular dichroism (ICD) of a disintegration type to optically active amines and amino alcohols in an organic solvent such as dimethyl sulfoxide (DMSO) (Japanese Patent Publication No. 176243/1997) and, due to such a unique property, utilization of them as chiral sensors and agents for optical resolution is expected. However, the said polymer has some difficulties in view of necessity of reactions of many steps for its synthesis that triphenylmethyl ester which is the corresponding monomer is polymerized in an organic solvent using a rhodium catalyst and then an ester group in the side chain is hydrolyzed with an acid. In view of economy, environmental problem, etc., a process for the direct polymerization of (4-carboxyphenyl)acetylene in water is preferred. However, carboxylic acid such as acetic acid has been frequently used already as a stopping agent for polymerization of acetylene monomer using a rhodium catalyst and, due to such a reason, there has been no example where acetylene monomer having an acidic site like carboxylic acid is polymerized using a rhodium catalyst. Although there is a report for dispersion polymerization of a hydrophobic monomer such as phenylacetylene in water using a rhodium catalyst, there has been no example where a water-soluble acetylene monomer is homogeneously polymerized in water.

DISCLOSURE OF THE INVENTION

An object of the present invention is to provide a process for the production of a polyacetylene derivative which is more preferred in view of economy, environmental problem, etc. in which the polyacetylene derivative having an ability of discrimination of asymmetry can be produced by a few steps in an easy manner and in a high yield.

BEST MODE FOR CARRYING OUT THE INVENTION

Figure 1:
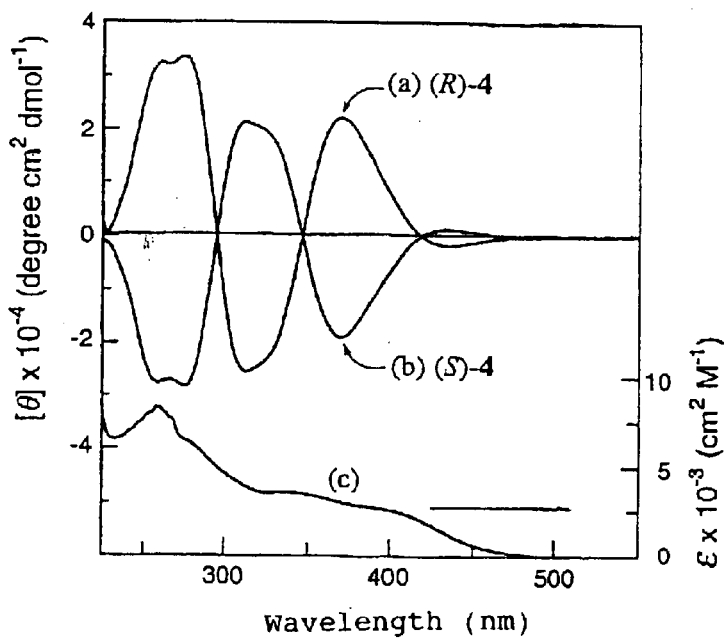
FIG. 1 shows CD spectrum and absorption spectrum of sodium salt of polymer of (4-carboxyphenyl)acetylene (polymer 1-Na) in water at room temperature in the presence of (R)- or (S)-phenylalaninol. (a) in FIG. 1 is a CD spectrum of polymer 1-Na-(R)-phenylalaninol; (b) is a CD spectrum of polymer 1-Na-(S)-phenylalaninol; and (c) is an absorption spectrum of polymer 1-Na-(R)-phenylalaninol.

The present inventors have carried out an intensive investigation for solving the above-mentioned problems and found that an acetylene derivative having a hydrophilic functional group such as (4-carboxyphenyl)acetylene and propargylic acid is polymerized within a short period in a high yield even in water by a water-soluble rhodium catalyst in the presence of an appropriate base such as NaOH or amine whereupon the present invention has been achieved.

Thus, the present invention relates to an invention which is a process for the production of a polyacetylene derivative, characterized in that, an acetylene derivative having a hydrophilic functional group is subjected to a polymerization reaction in an aqueous solvent in the presence of water-soluble transition metal complex catalyst and base.

The present invention further relates to an invention for a chiral sensor or an agent for optical resolution comprising a salt of poly(carboxyarylacetylene derivative).

Examples of the hydrophilic functional group in the acetylene derivative having a hydrophilic functional group therein used in the present invention are carboxyl group, carboxyalkyl group, sulfonic acid group, sulfoalkyl group and phosphono group.

Examples of the carboxyalkyl group are carboxymethyl group, car boxyethyl group and carboxypropyl group and examples of thesulfoalkyl group are sulfomethyl group, sulfoethyl group, sulfopropyl group and hydroxysulfopropyl group.

Examples of the acetylene derivative having a hydrophilic functional group used in the process for the production according to the present invention are an arylacetylene derivative having the above-mentioned hydrophilic functional group in the side chain and an aliphatic acetylene derivative having the above-mentioned hydrophilic functional group.

Examples of the aryl group in the aryl acetylene derivative having a hydrophilic functional group in the side chain are monocyclic, fused cyclic or polycyclic carbon cyclic aromatic group having 6 to 30 or, preferably, 6 to 15 carbons such as phenyl group, naphthyl group and phenanthryl group and five to eight-membered monocyclic, fused cyclic or polycyclic heteroaryl group containing 1 to 3 nitrogen, oxygen or sulfur atoms as a hetero atom, such as pyridyl group and quinolyl group. With regard to the arylacetylene derivative of the present invention having the above-mentioned hydrophilic function group in the side chain, anything may be used so far as the aryl group has the above-mentioned hydrophilic functional group as a substituent and, with regard to the substituted position for the hydrophilic functional group, there is no particular limitation so far as it is a substitutable position although a para-position is preferred in view of easiness in synthesis, etc.

Such an aryl group may be further substituted in addition to the above-mentioned hydrophilic group and examples of such a further substituent are alkyl group, alkoxy group and ester group. However, in order to maintain the hydrophilicity of the polymer of the present invention, it is not preferred to introduce a hydrophobic substituent which deteriorates the hydrophilicity of the polymer of the present invention.

Examples of the aliphatic acetylene derivative having a hydrophilic functional group are propargylic acid and acetylenedicarboxylic acid although they are not limitative.

With regard to the water-soluble transition metal complex catalyst used in the process for the production according to the present invention, a substance which is a complex of transition metal such as Rh, Ru, Mo and W and is soluble in water may be listed. Particularly preferred one is a water-soluble rhodium complex catalyst and its specific examples are the compounds represented as follows.

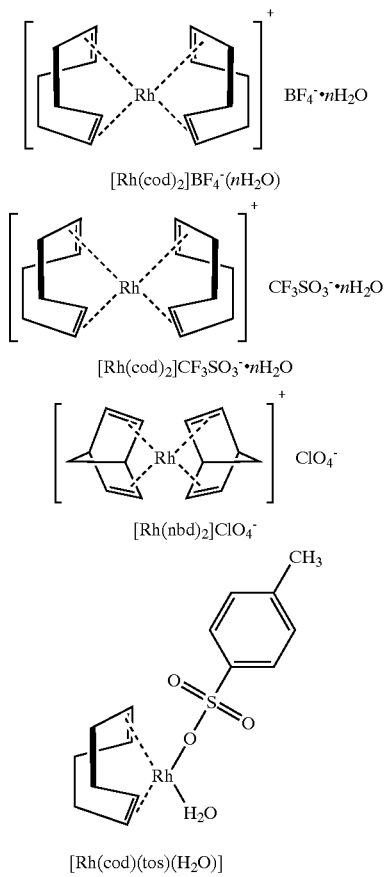

In the formula, cod=1,5-cyclooctadiene, nbd=nobornadiene and tos=tosyl group (p-toluenesulfonyl group).

With regard to the base used in the process for the production according to the present invention, anything may be used so far as it is a base which is able to form a salt with an acetylene derivative having a hydrophilic functional group used in the present invention and its examples are alkaline metal hydroxide such as sodium hydroxide and potassium hydroxide; amine such as diethylamine, triethylamine, ethanolamine, phenylglycinol, tetramethylammonium hydroxide, tetraethylammonium hydroxide and benzyltrimethylammonium hydroxide; and ammonia (ammonium hydroxide) although they are not limitative.

With regard to water used as a solvent for the reaction, it is usually preferred to use deionized distilled water although that is not essential.

There is no particular limitation for the reaction temperature but the range of from low temperature to high temperature may be appropriately selected although it is usually about 20 to 40° C. With regard to the reaction time, although that may vary depending upon the type of the monomer to be polymerized, reaction temperature, etc., it is usually from several hours to several tens hours.

The after-treatment, etc. after the reaction may be conducted in a conventional manner that, for example, when the aimed polymer is a salt which is insoluble in organic solvent, extrusion using a water-soluble organic solvent is conducted while, when the aimed polymer has a hydrophilic group and is insoluble in water, the polymer is separated by, for example, neutralization with an acid and collected, washed and dried.

Molecular weight of the polyacetylene derivative prepared by the process for the production according to the present invention may vary depending upon the starting monomer, catalyst and base used, polymerization time, etc. and it is usually not less than 350, generally not less than 3,500, more generally not less than 5,000 and, most generally, not less than 10,000.

The monomer for the production of the polymer of the present invention may be manufactured by known methods. When the monomer is (carboxyphenyl)acetylene for example, ethyl bromobenzoate is made to react with trimethylsilylacetylene by a conventional method and the resulting corresponding trimethylsilylacetylene derivative is hydrolyzed in an alkaline aqueous solution to remove trimethylsilyl group and ethyl group whereupon the aimed (carboxyphenyl)acetylene is obtained.

The polyacetylene derivative of the present invention is able to be manufactured in water, has a unique property that it shows a circular dichroism in a long wavelength region in water in the presence of optically active amino acid or optically active amino alcohol and is expected to be utilized as chiral sensor, agent for optical resolution, liquid crystals, nonlinear optical material and other functional materials.

From the viewpoint of environmental problems in recent years, there have been brisk studies both in and outside our country for the development of catalysts and systems whereby the organic synthetic reaction and polymerization reaction in water are made possible. Up to now however, there has been no example yet where a monomer having a hydrophilic group such as a carboxylic acid site is synthesized in water in a stereospecific manner and by a homogeneous reaction. The present inventors have noted of a simple but new idea that the reaction of active carboxylic acid site with a base in water gives rise to a conversion to a carboxylate whereby polymerization is made possible and achieved the novel polymerization reaction of the present invention.

It is believed that, when the present invention is applied, it is now possible to utilize to various other polymerizations and organic synthetic reactions.

The present inventors have further found that (4-carboxyphenyl)acetylene polymer (hereinafter, may be referred to as "polymer 1") in a form of a sodium salt (hereinafter, may be referred to as "polymer 1-Na") obtained as such shows an ICD to various optically active amino acids and amino alcohols in water which are very useful starting materials in the field of development of pharmaceuticals and functional materials. There has been almost no case up to now where chirality of amino acid in water is detected and the polymer of the present invention is greatly expected as a chiral sensor or an agent for optical resolution for amino acids, etc. in water.

Thus, the polymer 1-Na is a solid in a yellowish orange color, has absorptions in ultraviolet to visible regions, is soluble in water and shows an induced circular dichroism (ICD) peak of a disintegration type in the said regions in water in the presence of various kinds of optically active amines, amino alcohols and amino acids. It is believed that, since an optically active compound forms a salt with the polymer 1-Na even in water whereby a helical structure in which the main chain is twisted in one direction, i.e. to right or left, the ICD is available.

FIG. 1 shows CD spectrum and absorption spectrum of the polymer 1-Na in water at room temperature (about 25° C.) in the presence of (R)- or (S)-phenylalaninol). (a) in FIG. 1 is a CD spectrum of polymer 1-Na-(R)-phenylalaninol; (b) is a CD spectrum of polymer 1-Na-(S)-phenylalaninol; and (c) is an absorption spectrum of polymer 1-Na-(R)-pheylalaninol.

Figure 2:
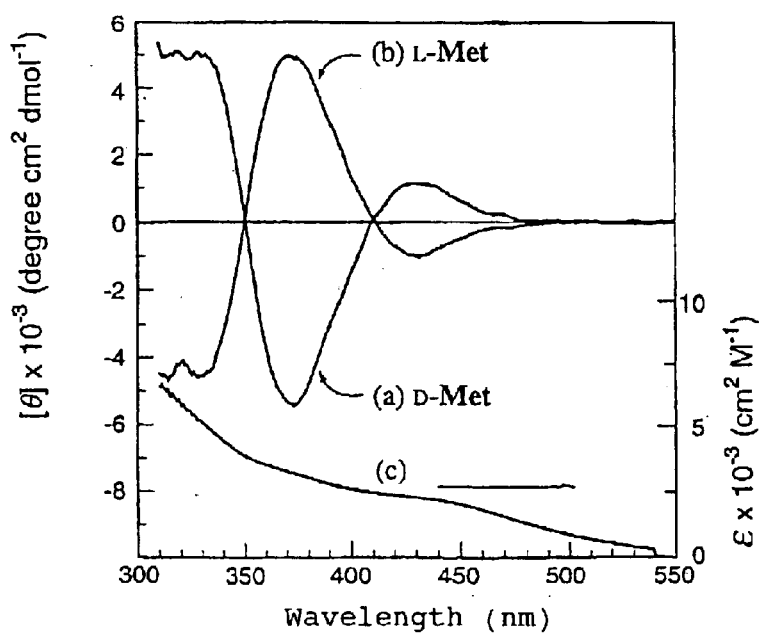
FIG. 2 shows CD spectrum and absorption spectrum of polymer 1-Na in water at −10° C. in the presence of D- or L-methionine. (a) in FIG. 2 is a CD spectrum of polymer 1-Na-D-methionine; (b) is a CD spectrum of polymer 1-Na-L-methionine; and (c) is an absorption spectrum of polymer 1-Na-D-methionine.

FIG. 2 shows CD spectrum and absorption spectrum of the polymer 1-Na in water at −10° C. in the presence of D- or L-methionine. (a) in FIG. 2 is a CD spectrum of polymer 1-Na-D-methionine; (b) is a CD spectrum of polymer 1-Na-L-methionine; and (c) is an absorption spectrum of polymer 1-Na-D-methionine.

Further, the polymer 1-Na similarly showed the ICD in the presence of eight kinds of optically active amines represented by the following formula (1) to (8)

(S)-2    (1)

(S)-3    (2)

(S)-4    (3)

(R)-4    (4)

(R)-5    (5)

(1R,2S)-6    (6)

(1S,2R)-6    (7)

(S)-7    (8)

and in the presence of eight kinds of optically active amino acids represented by the following formula (9) to (16).

R =

—$CH_2CH_2(CH_3)_2$    (9)
L-Leucine
L-Leu

—$\underset{|}{C}HCH_2CH_3$ with $CH_3$    (10)
L-Isoleucine
L-Ile

—$CH_2$—(indole)    (11)
L-Tryptophan
L-Trp

—$CH_2(CH_2)_3NH_3^+Cl^-$    (12)
L-Lysine-HCl
L-Lys-HCl

—$CH_2CH_2CNH_2$ (with =O)    (13)
L-Glutamine
L-Gln

—$CH_2(CH_2)_2NHCNH_2$ (with =$NH_2^+Cl^-$)    (14)
L-Arginine-HCl
L-Arg-HCl

-continued

—CH₂CH₂SCH₃ (15)
L-Methionine
L-Met

R =

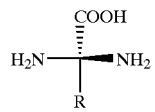

—CH₂CH₂SCH₃ (16)
L-Methionine
D-Met

It has been found that the disintegration pattern of ICD changes depending upon the absolute configuration of the optically active substance used and that, in any case, ICD in the same sign is available provided that the absolute configurations are same. When such a property is utilized, it is possible to utilize the ICD of the polymer 1-Na as a means for predicting the absolute configuration of various amines and amino acids.

Table 1 shows the result of ICD of the polymer 1-Na in water in the presence of the above-mentioned eight kinds of optically active amines and amino alcohols and Table 2 shows that in the presence of the above-mentioned eight kinds of optically active amino acids.

Cell length: 0.05 cm
Measuring temperature: room temperature (ca. 25° C.)
[θ]: unit (degree cm²dmol⁻¹)
λ: unit (nm)
Conditions for the measurement of ICD in Table 2 are as follows.
Measuring Conditions (Table 2)
Polymer 1-Na: 1.0 mg/mL: 6.0 mmol monomer unit
Chiral amine/polymer 1-Na (molar ratio): 10
(5 in the case of Experiment No. 4 only)
Solvent: water
Cell length: 0.05 cm
Measuring temperature: −10° C. (0° C. in the case of Experiment No. 5 only)
[θ]: unit (degree cm²dmol⁻¹)
λ: unit (nm)

Incidentally, in the case of propargylic acid polymer (hereinafter, may be referred to as "polymer 2") which is an aliphatic acetylene derivative having a hydrophilic functional group in a form of sodium salt (hereinafter, may be referred to as "polymer 2-Na"), although its peak intensity was weak as compared with that of the polymer 1-Na, it also showed an induced circular dichroism (ICD) peak in this region in water in the presence of optically active amino alcohol.

TABLE 1

Signs and molar elliptic rates [θ] of Cotton effect of disintegration type of amine complex with polymer 1-Na

| Experiment No. | Amine | First Cotton Sign | [θ] × 10⁻³ (λ) | Second Cotton Sign | [θ] × 10⁻³ (λ) | Third Cotton Sign | [θ] × 10⁻³ (λ) |
|---|---|---|---|---|---|---|---|
| 1 | (S)-2 | + | 1.07 (428) | − | 3.92 (369) | + | 3.57 (329) |
| 2 | (S)-3 | + | 0.38 (429) | − | 2.02 (369) | + | 2.25 (323) |
| 3 | (S)-4 | + | 1.40 (432) | − | 18.9 (369) | + | 21.4 (312) |
| 4 | (R)-4 | − | 1.29 (434) | + | 17.5 (369) | − | 20.0 (312) |
| 5 | (R)-5 | − | 0.49 (431) | + | 3.05 (369) | − | 2.45 (322) |
| 6 | (1R,2S)-6 | + | 1.53 (429) | − | 9.97 (369) | + | 8.03 (327) |
| 7 | (1S,2R)-6 | − | 1.47 (432) | + | 10.4 (369) | − | 8.20 (327) |
| 8 | (S)-7 | + | 1.31 (425) | − | 6.64 (367) | + | 6.15 (329) |

TABLE 2

Signs and molar elliptic rates [θ] of Cotton effect of disintegration type of amino acid complex with polymer 1-Na

| Experiment No. | Amino Acid | First Cotton Sign | [θ] × 10⁻³ (λ) | Second Cotton Sign | [θ] × 10⁻³ (λ) | Third Cotton Sign | [θ] × 10⁻³ (λ) |
|---|---|---|---|---|---|---|---|
| 1 | L-Leu | − | 0.51 (426) | + | 2.87 (369) | − | 2.19 (326) |
| 2 | L-Ile | − | 0.58 (429) | + | 2.40 (369) | − | 2.17 (329) |
| 3 | L-Trp | − | 1.90 (429) | + | 14.7 (370) | − | – |
| 4[b] | L-Lys-HCl | − | 2.33 (429) | + | 8.28 (371) | − | 6.43 (331) |
| 5 | L-Gln | − | – | + | 0.35 (367) | − | 0.37 (331) |
| 6 | L-Arg-HCl | − | 4.84 (428) | + | 14.9 (368) | − | 11.3 (331) |
| 7 | D-Met | + | 1.14 (430) | − | 5.44 (371) | + | 5.08 (328) |
| 8 | L-Met | − | 1.02 (432) | + | 5.00 (371) | − | 4.61 (328) |

Conditions for the measurement of ICD in Table 1 are as follows.
Measuring Conditions (Table 1)
Polymer 1-Na: 1.0 mg/mL: 6.0 mmol monomer unit
Chiral amine/polymer 1-Na (molar ratio): 10
Solvent: water

EXAMPLES

The present invention will now be illustrated more specifically as hereunder by way of Examples although the present invention is not limited thereto.

Figure 3:
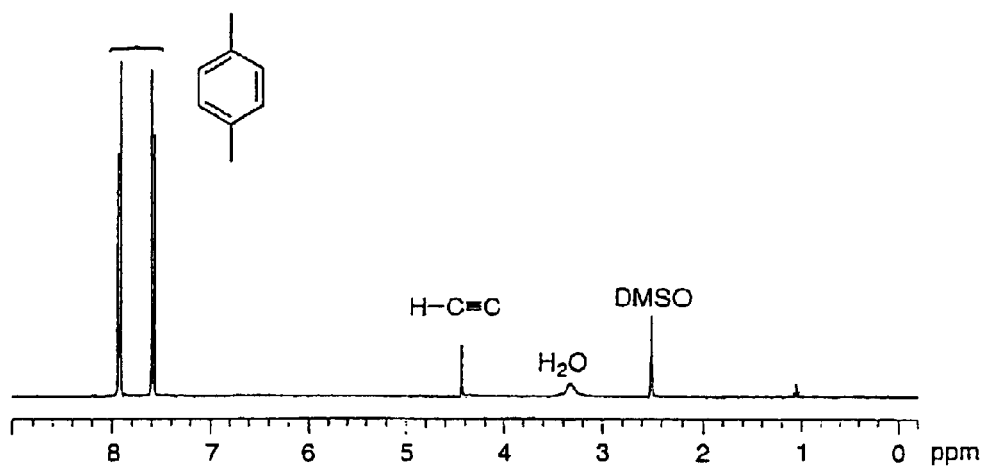
FIG. 3 shows a chart of $^1$H NMR spectrum of (4-carboxyphenyl)acetylene in DMSO at 25° C. obtained in (1) of Example 1.

Example 1
Synthesis of poly(4-carboxyphenyl)acetylene (1) Synthesis of (4-carboxyphenyl)acetylene In a nitrogen atmosphere, 250 g (0.906 mol) of ethyl 4-bromobenzoate were made to react with 0.19 L (1.4 mol) of trimethylsilylacetylene at room temperature for 16 hours in dry triethylamine (2 L) in the presence of 3.80 g (14.5 mmol) of triphenylphosphine, 4.14 g (21.7 mmol) of copper iodide and 2.54 g (3.6 mmol) of triphenylphosphine palladium dichloride. The product was purified by a column chromatography using silica gel (eluent: a 1:2 mixture of ethyl acetate and hexane) to give 210 g (93.9%) of the corresponding trimethylsilylacetylene derivative. The product (190 g; 0.77 mmol) was hydrolyzed in a 1N aqueous solution of sodium hydroxide (0.97 L) to remove trimethylsilyl group and ethyl group where upon the aimed product was prepared. Purification was carried out by means of recrystallization from ethanol to give 68.5 g (yield: 61%) of crystals in pale yellow ashy color. FIG. 3 shows a $^1$H NMR spectrum of the resulting (4-carboxyphenyl)acetylene.

(2) Polymerization of (4-carboxyphenyl)acetylene (monomer 1)

Figure 4:
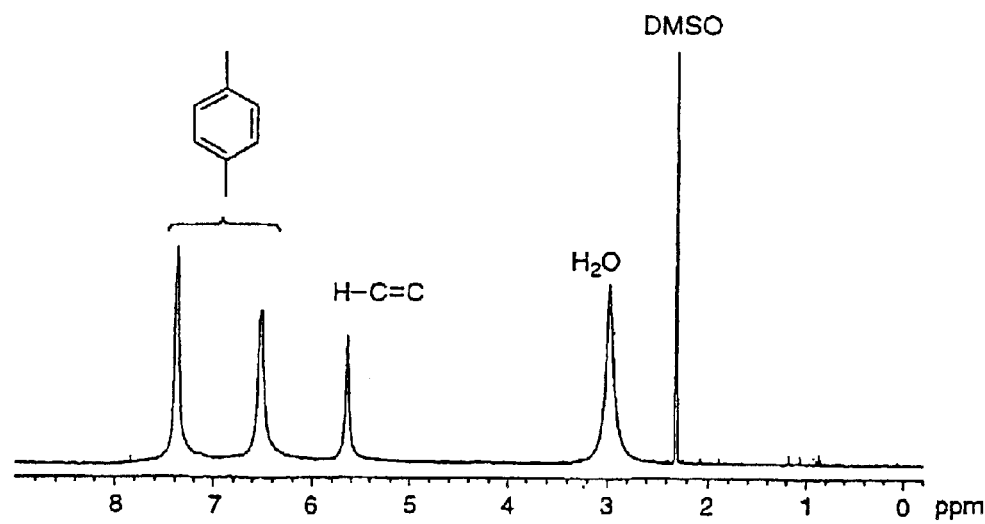
FIG. 4 shows a chart of $^1$H NMR spectrum of (4-carboxyphenyl)acetylene polymer (polymer 1) in DMSO at 60° C. obtained in (2) of Example 1.

Polymerization was carried out in a nitrogen atmosphere using deionized distilled water as a solvent. (4-Carboxyphenyl)acetylene (0.2 g; 1.37 mmol) was dissolved in water containing a predetermined amount (2.05 mmol) of NaOH, a predetermined amount of a rhodium catalyst such as an aqueous solution of 8 mg of [(Rh(cod)$_2$]BF$_4$.(nH$_2$O) (cod=1,5-cyclooctadiene) was added thereto and polymerization was started. Concentration of the monomer was 0.5 M and the molar ratio of the monomer to the catalyst was [monomer]/[Rh]=200. After the polymerization was carried out at 30° C. for 3 hours and the reaction solution was poured over a large excess of ethanol whereupon sodium salt of polymer of (4-carboxyphenyl)acetylene (polymer 1-Na) in a fibrous shape in yellowish orange color was obtained quantitatively. A part of the resulting polymer was stirred for 1 hour in a 1N aqueous solution of hydrochloric acid, the polymer was recovered by centrifugal separation, well washed with water and dried and polymer of (4-carboxyphenyl)acetylene (polymer 1) was obtained quantitatively. The polymer 1 was made to react with trimethylsilyldiazomethane to convert to the corresponding methyl ester and its number-average molecular weight (58,000) and molecular weight distribution (2.5) were determined by means of a size exclusion chromatography (SEC) (eluent: chloroform) using polystyrene as a standard sample. From the $^1$H NMR of the polymer 1, the stereo regularity of the resulting polymer is believed to be nearly 100% of cis-transoid. When amine was used as a base, a polymer of 100% of cis-transoid structure was obtained as well. When polymerization was carried out in air (Experiment No. 2 in Table 3), a polymer of 100% of cis-transoid was obtained in a high yield as well. The result where polymerization was carried out under other polymerization conditions and other Rh catalysts were used is shown in Table 3. FIG. 4 shows $^1$H NMR spectrum of the polymer 1 in DMSO-d$_6$ at 60° C.

Polymerization condition for Table 3 is as follows.

Monomer concentration: 0.5 M

Monomer/catalyst (molar ratio): 200

Base/monomer (molar ratio): 1.5

Yield means the yield of polymer 1-Na for Experiment Nos. 1–5 and, for Experiment Nos. 6 to 10, it means the yield of water-insoluble polymer 1 after neutralization.

In Experiment No. 2, polymerization was carried out in air for 48 hours.

TABLE 3

Polymerization in Water using Water-Soluble Rhodium Catalyst in the Presence of Monomer 1 Base (Polymerization Temperature: 30° C.; Polymerization Time: 3 hours)

| Expt No. | Catalyst | Base[b] | Yield (%)[c] | Molecular Weight × 10$^{-4}$[d] | Molecular Weight Distribution[d] |
|---|---|---|---|---|---|
| 1 | [Rh(cod)$_2$]BF$_4^-$(nH$_2$O) | NaOH | 100 | 5.8 | 2.5 |
| 2[a] | [Rh(cod)$_2$]BF$_4^-$(nH$_2$O) | NaOH | 90 | 2.9 | 3.0 |
| 3 | [Rh(cod)$_2$]CF$_3$SO$_3^-$(nH$_2$O) | NaOH | 74 | 2.9 | 3.3 |
| 4 | [Rh(nbd)$_2$]ClO$_4^-$ | NaOH | 80 | 6.4 | 4.2 |
| 5 | [Rh(cod)(tos)(H$_2$O)] | NaOH | 80 | 8.5 | 2.1 |
| 6 | [Rh(cod)$_2$]BF$_4^-$(nH$_2$O) | Diethylamine | 85 | 4.0 | 3.4 |
| 7 | [Rh(nbd)$_2$]ClO$_4^-$ | Diethylamine | 88 | 16 | 4.9 |
| 8 | [Rh(cod)(tos)(H$_2$O)] | Diethylamine | 83 | 4.6 | 3.6 |
| 9 | [Rh(cod)$_2$]BF$_4^-$(nH$_2$O) | Tetraethylammonium hydroxide | 68 | 3.1 | 3.2 |
| 10 | [Rh(cod)$_2$]BF$_4^-$(nH$_2$O) | (R)-Phenylglycinol | 95 | 0.9 | 4.1 |

Notes:
cod = 1,5-cyclooctadiene
nbd = norbornadiene
tos = tosyl group (p-toluenesulfonyl group)

Example 2
Polymerization of Propargylic Acid (Monomer 2)

Figure 5:
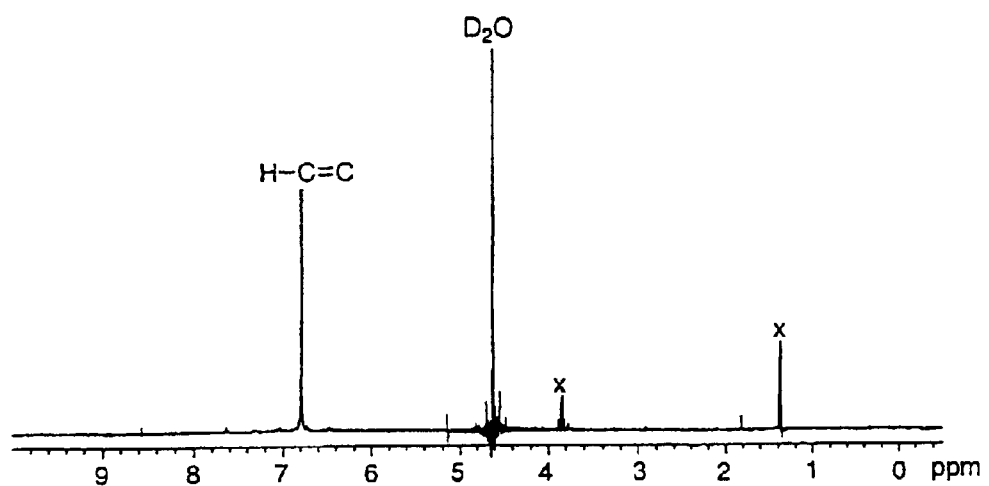
FIG. 5 shows a chart of $^1$H NMR spectrum of sodium salt of polymer of propargylic acid (polymer 2-Na) in heavy water at 40° C. obtained in Example 2.

With regard to propargylic acid, a commercially available product after purifying by distillation was used. Polymerization was carried out in a nitrogen atmosphere using deionized distilled water as a solvent. Propargylic acid (0.1 ml; 1.62 mmol) was dissolved in water containing a predetermined amount (2.43 mmol) of NaOH, an aqueous solution of a predetermined amount of rhodium catalyst [Rh(cod)$_2$]BF$_4$ (nH$_2$O) (cod=1,5-cyclooctadiene) was added thereto and polymerization was started. Monomer concentration was 1.0 M and the molar ratio of the monomer to the catalyst was [monomer]/[Rh]=100. After the polymerization was carried out at 30° C. for 24 hours, the reaction solution was poured into a large excess of ethanol and yellow fibrous sodium salt propargylate (polymer 2-Na) was obtained in a high yield (yield: 71%). A part of the resulting polymer was stirred for 1 hour in a 1N aqueous solution of hydrochloric acid, the polymer was recovered by centrifugal separation, well washed with water and dried and polypropargylic acid (polymer 2) was obtained quantitatively. The polymer 2 was made to react with trimethylsilyldiazomethane to convert to the corresponding methyl ester and measurement of molecular weight of the resulting polymer was tried by means of a size exclusion chromatography (SEC) (eluent: chloroform) using polystyrene as a standard sample but, since the sample was adsorbed with polystyrene, calculation of a precise molecular weight was difficult. From the $^1$H NMR of the polymer 2-Na, the stereo regularity of the resulting polymer is believed to be nearly 100% of cis-transoid. When amine was used as a base, a polymer was obtained in a relatively high yield as well. The result where polymerization was carried out under other polymerization conditions and other Rh catalysts were used is shown in Table 4. FIG. 5 shows $^1$H NMR spectrum of the polymer 2-Na in heavy water at 40° C.

Polymerization condition for Table 4 is as follows.
Monomer concentration: 1.0 M
Monomer/catalyst (molar ratio): 100
Base/monomer (molar ratio): 1.5

TABLE 4

Polymerization in Water using Water-Soluble Rhodium Catalyst in the Presence of Monomer 2 Base (Polymerization Temperature: 30° C.; Polymerization Time: 24 hours)

| Expt. No. | Catalyst | Base[b] | Yield (%)[c] |
|---|---|---|---|
| 1 | [Rh(cod)$_2$]BF$_4^-$(nH$_2$O) | NaOH | 71 |
| 2 | [Rh(cod)$_2$]BF$_4^-$(nH$_2$O) | Diethylamine | 37 |

Example 3
Ability for Discriminating the Asymmetry Caused by Helical Induction

Absorption spectrum and CD spectrum in the presence of the polymer 1-Na obtained in Example 1 and (R)- or (S)-phenylalaninol were measured under the following condition.

Measuring Condition (FIG. 1) Polymer 1-Na: 1.0 mg/mL: 6.0 mmol monomer unit
(R)- or (S)-phenylalaninol (60 mmol) ([phenylalaninol]/[polymer 1-Na]=10 mol/mol)
Solvent: water
Cell length: 0.05 cm
Measuring temperature: room temperature (ca. 25° C.)
Absorption spectrum: JASCO V-570 manufactured by Nippon Bunko Kabushiki Kaisha
CD spectrum: JASCO J-725L manufactured by Nippon Bunko Kabushiki Kaisha Result of the measurement is shown in FIG. 1. (a) in FIG. 1 is a CD spectrum of polymer 1-Na-(R)-phenylalaninol; (b) is a CD spectrum of polymer 1-Na-(S)-phenylalaninol; and (C) is an absorption spectrum of polymer 1-Na-(R)-phenylalaninol.

Example 4
Ability for Discriminating the Asymmetry Caused by Helical Induction

Absorption spectrum and CD spectrum in the presence of the-polymer 1-Na obtained in Example 1 and D- or-L-methionine were measured under the following condition.

Measuring Condition (FIG. 2)
Polymer 1-Na: 1.0 mg/mL: 6.0 mmol monomer unit L- or D-methionine (61 mmol) ([methionine]/[polymer 1-Na]= 10)
Solvent: water
Cell length: 0.1 cm
Measuring temperature: –10° C.
Absorption spectrum: JASCO V-570 manufactured by Nippon Bunko Kabushiki Kaisha
CD spectrum: JASCO J-725L manufactured by Nippon Bunko Kabushiki Kaisha Result of the measurement is shown in FIG. 2. (a) in FIG. 2 is a CD spectrum of polymer 1-Na-D-methionine; (b) is a CD spectrum of polymer 1-Na-L-methionine; and (c) is an absorption spectrum of polymer 1-Na-D-methionine.

Example 5
Measurement of Cotton Effect of Disintegration Type

Sign of Cotton effect and molar elliptic rate [θ] of various compounds in water in the presence of the polymer 1-Na were measured under the measuring conditions as shown in each of the tables.

The results are shown in Tables 1 to 2.

Industrial Applicability

The present invention provides a novel process for the production of a polyacetylene derivative and, in accordance with the process for the production of the present invention, it is possible to obtain a polyacetylene derivative having an ability of discriminating the asymmetry using water as a solvent, by a few steps, in an easy manner and in a high yield whereupon this is a more preferred producing process in view of economy, environmental problems, etc.

Further, in accordance with the present invention, a polyacetylene derivative is able to be produced in water and the resulting polyacetylene derivative has a unique property of showing a circular dichroism in a long wavelength region in water in the presence of optically active amino acid or optically active amino alcohol whereby the product is expected to be utilized as chiral sensor, agent for optical resolution, liquid crystal nonlinear optical material and other functional materials.

What is claimed is:

1. A process for the production of a polyacetylene derivative, said process comprising subjecting an acetylene derivative having a hydrophilic functional group to a polymerization reaction in an aqueous solution in the presence of a water-soluble transition metal complex catalyst and a base.

2. The process for the production of a polyacetylene derivative according to claim 1, wherein the water-soluble transition metal complex catalyst is a water-soluble rhodium complex catalyst.

3. The process for the production of a polyacetylene derivative according to claim 1 or 2, wherein the base is alkaline metal hydroxide, ammonia or amine.

4. The process for the production of a polyacetylene derivative according to claim 1 or 2, wherein the base is sodium hydroxide.

5. The process for the production of a polyacetylene derivative according to claim 1 or 2, wherein the hydrophilic functional group is a carboxyl group, a carboxyalkyl group, a sulfonic acid group, a sulfoalkyl group or a phosphono group.

6. The process for the production of a polyacetylene derivative according to claim 1 or 2, wherein the acetylene derivative having a hydrophilic functional group is an arylacetylene derivative having a hydrophilic functional group in the side chain.

7. The process for the production of a polyacetylene derivative according to claim 1, wherein the polyacetylene derivative is a salt of poly(carboxyarylacetylene derivative).

8. The process for the production of a polyacetylene derivative according to claim 7, wherein the salt of poly (carboxyarylacetylene derivative) is a sodium salt of poly (4-carboxyphenyl) acetylene.

9. The process for the production of a polyacetylene derivative according to claim 1 or 2, wherein the acetylene derivative having a hydrophilic functional group is an aliphatic acetylene derivative having a hydrophilic functional group.

10. The process for the production of a polyacetylene derivative according to claim 9, wherein the aliphatic acetylene derivative having a hydrophilic functional group is propargylic acid.

* * * * *